United States Patent
Uemura

(10) Patent No.: US 8,055,404 B2
(45) Date of Patent: *Nov. 8, 2011

(54) SENSOR APPARATUS

(75) Inventor: Takeshi Uemura, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/693,757

(22) Filed: Jan. 26, 2010

(65) Prior Publication Data

US 2010/0194401 A1  Aug. 5, 2010

(30) Foreign Application Priority Data

Feb. 5, 2009  (JP) ................................. 2009-024663

(51) Int. Cl.
*G01M 17/00* (2006.01)
(52) U.S. Cl. ........................... 701/34; 701/29; 324/750.3
(58) Field of Classification Search .................. None
See application file for complete search history.

(56) References Cited

U.S. PATENT DOCUMENTS

| | | | |
|---|---|---|---|
| 3,964,016 A | 6/1976 | Yamada et al. | |
| 7,746,091 B2 * | 6/2010 | Uemura | 324/750.3 |
| 2009/0138118 A1 | 5/2009 | Inokawa et al. | |
| 2009/0210186 A1 | 8/2009 | Siess | |
| 2009/0229134 A1 | 9/2009 | Nagase | |

FOREIGN PATENT DOCUMENTS

| | | |
|---|---|---|
| DE | 102006012074 A1 | 9/2004 |
| DE | 10-2006-023-213 B3 | 9/2007 |
| DE | 102006023213 B3 | 9/2007 |
| JP | 2001-074503 A | 3/2001 |
| JP | 2004-264074 A | 9/2004 |
| JP | 2004-301512 A | 10/2004 |
| JP | 2005-283481 A | 10/2005 |
| JP | 2005-331332 A | 12/2005 |
| JP | 2007-305632 A | 11/2007 |
| JP | 2008-002890 A | 1/2008 |
| JP | 04245081 B | 3/2009 |

OTHER PUBLICATIONS

Extended European Search Report for Appl. EP 10152210 dated Jun. 18, 2010.
US Office Action for U.S. Appl. No. 12/693,583 dated May 31, 2011.
Chinese Office action dated Jun. 22, 2011.

* cited by examiner

*Primary Examiner* — Mary Cheung
*Assistant Examiner* — Jerrah Edwards
(74) *Attorney, Agent, or Firm* — Pearne & Gordon LLP

(57) ABSTRACT

A sensor apparatus of the present invention includes a first output terminal for outputting a sense signal, and a failure diagnosis circuit for determining whether a failure diagnosis object section is normal or abnormal, to output a failure detection signal from a second output terminal in the case of determining abnormality. The time required for an output concerning the failure detection signal from the failure diagnosis object section to reach the second output terminal is shorter than the time required for an output concerning the sense signal from the failure diagnosis object section to reach the first output terminal, thus leading to improvement in reliability under abnormal condition.

1 Claim, 3 Drawing Sheets

Time required for an output concerning the failure detection signal from the failure diagnosis object section to reach the second output terminal < Time required for an output concerning the sense signal from the failure diagnosis object section to reach the first output terminal

PRIOR ART

SENSOR APPARATUS

FIELD OF THE INVENTION

The present invention relates to a sensor apparatus for use in automobiles, aircraft, vessels, robots, a variety of other electronic devices, and the like.

BACKGROUND OF THE INVENTION

A conventional sensor apparatus of this kind is described with reference to a drawing. FIG. 3 is an electric circuit diagram showing the conventional sensor apparatus.

As shown in FIG. 3, the sensor apparatus includes: first and second drive circuit sections 1A, 1B for outputting drive signals that drive detection device 2; and first and second detection circuit sections 3A, 3B for fetching response signals from detection device 2. The sensor apparatus further includes: first and second processing circuit sections 4A, 4B for fetching sensor signals from response signals from first and second detection circuit sections 3A, 3B; and output terminals 5A, 5B for outputting sense signals from first and second processing circuits 4A, 4B.

At least one of first and second drive circuit sections 1A, 1B, detection device 2, first and second detection circuit sections 3A, 3B, and first and second processing circuit sections 4A, 4B is set as an object of failure diagnosis and referred to as a failure diagnosis object section. Failure diagnosis circuit 6 electrically connected to the failure diagnosis object section performs failure detection on the failure diagnosis object section, and outputs a failure detection signal from output terminal 8 provided in failure diagnosis circuit 6.

It is to be noted that as related art document information concerning this application, for example, Unexamined Japanese Patent Publication No. 2004-301512 (Patent Document 1) is known. Such a conventional sensor apparatus has had a problem of low reliability under abnormality occurrence condition.

Specifically, in the above conventional configuration, there are cases where a sense signal is outputted from each of output terminals 5A, 5B before a failure detection signal is outputted from output terminal 8 due to a difference in passage channel of those signals. Even though a failure of the failure diagnosis object section has practically already been detected by failure diagnosis circuit 6, a sense signal under abnormal condition is transmitted to a controlled object such as an automobile. There has been a possibility of using a sense signal under abnormal condition for control of an automobile or the like, resulting in deterioration in reliability.

SUMMARY OF THE INVENTION

A sensor apparatus of the present invention includes: a drive circuit section for outputting a drive signal; a detection device, into which a drive signal from the drive circuit section is inputted; a detection circuit section for fetching a response signal from the detection device; a processing circuit section, into which a response signal from the detection circuit section is inputted and which fetches a sense signal from this response signal; a first output terminal for outputting a sense signal from the processing circuit section; and a failure diagnosis circuit for setting as a failure diagnosis object section at least any one of a drive circuit section, a detection device, the detection circuit section and the processing circuit section, determining whether the failure diagnosis object section is normal or abnormal, and also outputting a failure detection signal from a second output terminal in the case of determining abnormality. The sensor apparatus is configured such that the time required for an output concerning the failure detection signal from the failure diagnosis object section to reach the second output terminal is shorter than the time required for an output concerning the sense signal from the failure diagnosis object section to reach the first output terminal.

With this configuration, before a sense signal under abnormal condition is outputted from the first output terminal, a failure detection signal indicating the sense signal being one under abnormal condition can be outputted from the second output terminal. This can prevent the sense signal under abnormal condition from being used for control of an automobile or the like, resulting in improvement in reliability.

DESCRIPTION OF THE EXEMPLARY EMBODIMENT

Figure 1:
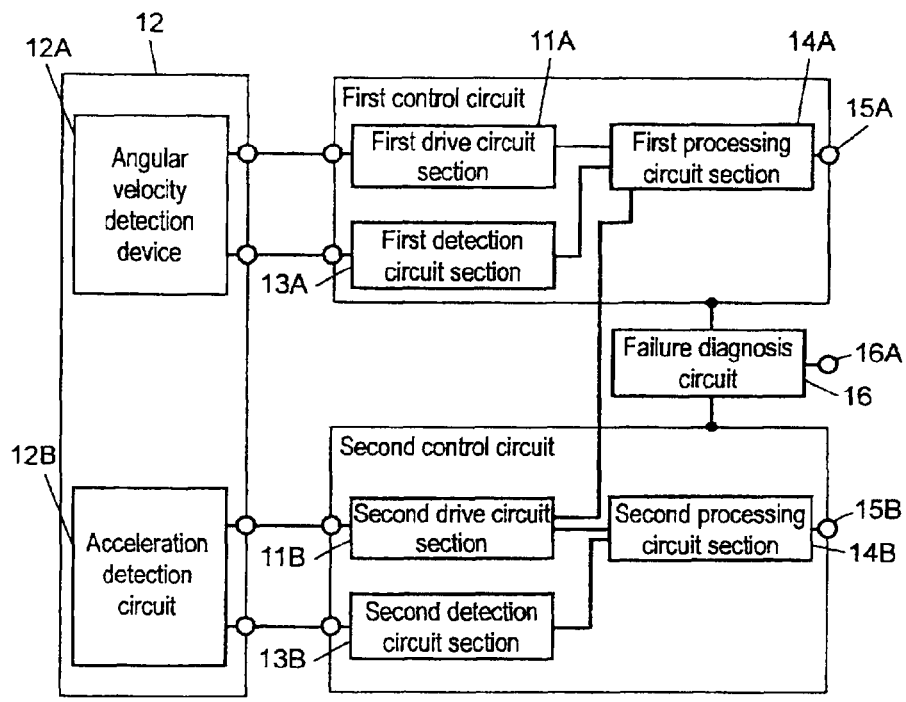
FIG. 1 is an electric circuit diagram showing a sensor apparatus of the present invention.

A description will be given below of a sensor apparatus using an inertia sensor according to an embodiment of the present invention with reference to drawings. FIG. 1 is an electric circuit diagram showing a sensor apparatus of the present invention.

As shown in FIG. 1, the sensor apparatus in the present embodiment includes: first and second drive circuit sections 11A, 11B for outputting drive signals; angular velocity detection device 12A, into which a first drive signal from first drive circuit section 11A is inputted; and acceleration detection device 12B, into which a second drive signal from second drive circuit section 11B is inputted. The sensor apparatus includes: first detection circuit section 13A for fetching a first response signal from angular velocity detection device 12A; and second detection circuit section 13B for fetching a second response signal from acceleration detection device 12B. The sensor apparatus further includes: first processing circuit section 14A; second processing circuit section 14B; and first output terminals 15A, 15B for outputting sense signals from first and second processing circuit sections 14A, 14B.

First processing circuit section 14A receives an input of the first response signal from first detection circuit section 13A and also fetches a first sense signal from this first response signal. Second processing circuit section 14B receives an input of the second response signal from second detection circuit section 13B and also fetches a second sense signal from this second response signal.

At least one of first drive circuit section 11A, angular velocity detection device 12A, first detection circuit section 13A and first processing circuit section 14A is set as a first failure diagnosis object section. At least one of second drive circuit section 11B, acceleration detection circuit 12B, second detection circuit section 13B and second processing circuit section 14B is set as a second failure diagnosis object section. Failure diagnosis circuit 16 determines whether first and second failure diagnosis object sections are normal or abnormal, and outputs a failure detection signal indicating abnormality of the sense signal from second output terminal 16A in the case of determining abnormality.

It is configured such that the time required for an output concerning each of the failure detection signals from the first and second failure diagnosis object sections to reach second output terminal 16A is shorter than the time required for an output concerning each of the sense signals from the first and second failure diagnosis object sections to reach first output terminals 15A, 15B.

Specifically, for example, failure diagnosis circuit 16 is electrically connected to both first detection circuit section 13A and second detection circuit section 13B, and first detection circuit section 13A is set as the first failure diagnosis object section while second detection circuit section 13B is set as the second failure diagnosis object section. Failure diagnosis circuit 16 determines whether each of first and second detection circuit sections 13A, 13B is normal or abnormal.

The time required for an output concerning each of the failure detection signals to be transmitted from first and second detection circuit sections 13A, 13B as the first and second failure diagnosis object sections to second output terminal 16A through failure diagnosis circuit 16 is referred to as T1, and the time required for an output concerning each of the first and second sense signals, namely the first and second respond signals to reach first output terminals 15A, 15B from first and second detection circuit sections 13A, 13B is referred to as T2. In the present invention, it is configured such that time T1 is shorter than time T2, namely the failure detection signals are outputted prior to the first and second sense signals.

With such a configuration, since the failure detection signals can be outputted from second output terminal 16A before the first and second sense signals are outputted from first output terminals 15A, 15B, it is possible to prevent the first and second sense signals under abnormal condition from being erroneously used for control of an automobile or the like, so as to improve the reliability.

In other words, when it is configured such that the first and second sense signals are outputted from first output terminals 15A, 15B before the failure detection signals are outputted from second output terminal 16A, even though a failure of each of the failure diagnosis object sections (first and second detection circuit sections 13A, 13B in the present embodiment) has practically already been detected by failure diagnosis circuit 16, the failure detection signals under abnormal condition may not be outputted in time. It may result in that the first and second sense signals under abnormal condition are used for control of automobile or the like.

According to the present embodiment, before the first and second sense signals as results under abnormal condition are outputted from first output terminals 15A, 15B, the failure detection signals indicating abnormality of the sense signals can be outputted from second output terminal 16A. It is therefore possible to prevent the first and second sense signals under abnormal condition from being used for control of an automobile or the like, thus leading to improvement in reliability.

It is to be noted that in the present embodiment, the first and second sense signals and the failure detection signals may be either digital output signals or analog output signals. As shown in FIG. 1, a configuration adopting analog output signals can be realized by separately providing first output terminals 15A, 15B, from which the first and second sense signals are outputted, and second output terminal 16A, from which the failure detection signals are outputted. It is also possible to reduce to one terminal from at least two terminals among first output terminals 15A, 15B and second output terminal 16A if time division system is used as digital output signals.

It is to be noted that in the present embodiment, the example is described where first and second detection circuit sections 13A, 13B are set as the first and second failure diagnosis object sections and the identical portions respectively in the angular velocity detection system and the acceleration detection system are set as the failure diagnosis object sections. However, it may be configured such that non-identical portions respectively in the angular velocity detection system and the acceleration detection system are set as the two failure diagnosis object sections, as in a case where first drive circuit section 11A is set as the first failure diagnosis object section and second processing circuit section 14B is set as the second failure diagnosis object section. In that case, it is necessary to make settings such that a shorter one between respective transmission time of outputs concerning first and second sense signals from the first and second failure diagnosis object sections to first output terminals 15A, 15B is referred to as T2, while a longer one between respective transmission time of outputs concerning failure detection signals from the first and second failure diagnosis object sections to second output terminal 16A is referred to as T1, and time T1 is shorter than time T2. Such settings are made for the purpose of outputting the failure detection signals prior to the first and second sense signals from second output terminal 16A.

It should be noted that in the present embodiment, the description is given using the two devices, angular velocity detection device 12A and acceleration detection device 12B, as detection device 12 and also using, as the circuit configuration corresponding thereto, the configuration having first and second drive circuit sections 11A, 11B, first and second detection circuit sections 13A, 13B, and first and second processing circuit sections 14A, 14B. However, it may be configured such that one detection device 12 is provided and as a circuit configuration corresponding thereto and only each one drive circuit section, detection circuit section, and processing circuit section is provided.

In addition, although detection device 12 is an element of the sensor apparatus in the present embodiment, the present invention can also be configured even with detection device 12 not being an element of the sensor apparatus. Specifically, the sensor apparatus of the present invention can be configured by including a drive circuit section, a detection circuit section, a processing circuit section, a failure diagnosis circuit, and an output circuit section, which exchange signals with detection device 12 provided outside the sensor apparatus.

Figure 2:
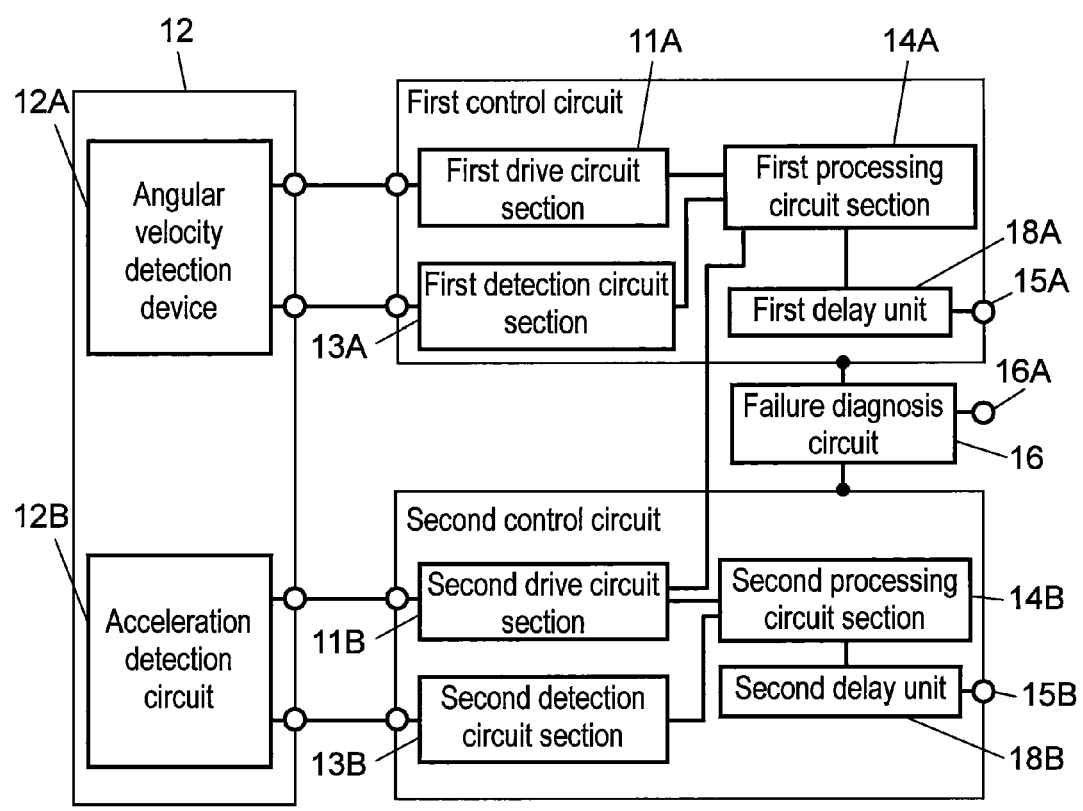
FIG. 2 is an electric circuit diagram showing another example of the sensor apparatus of the present invention.
Figure 3:
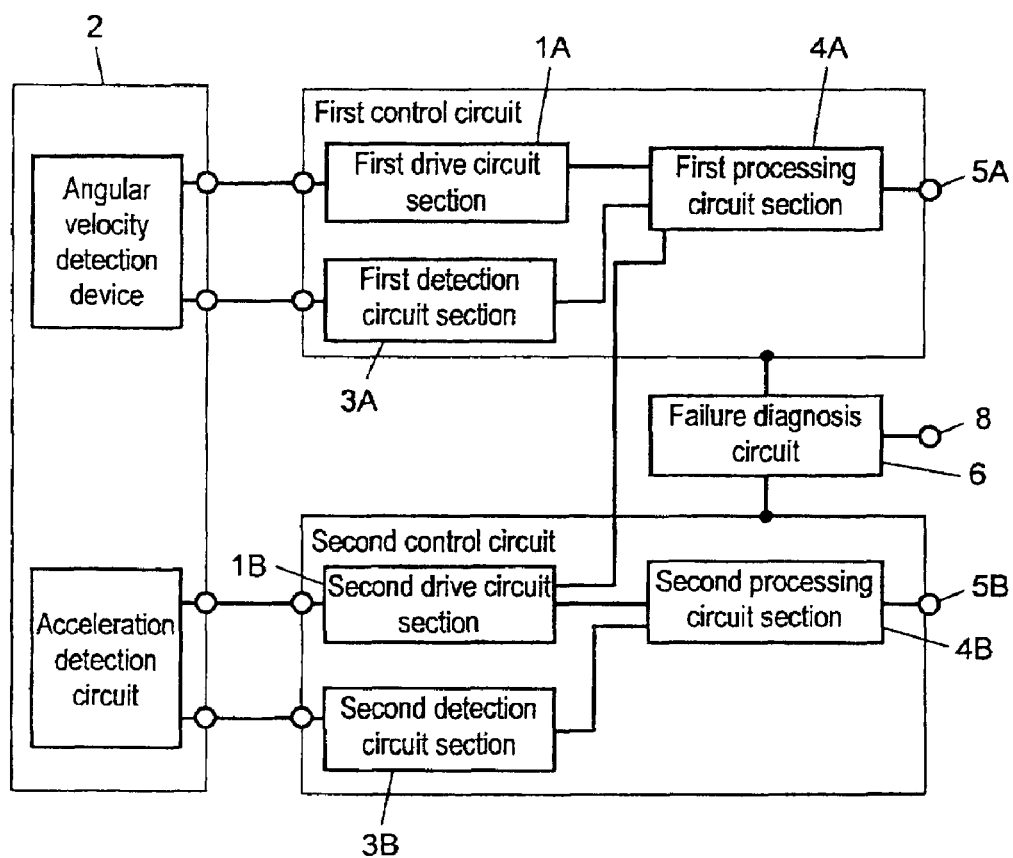
FIG. 3 is an electric circuit diagram showing a conventional sensor apparatus.

FIG. 2 is an electric circuit diagram showing another example of the sensor apparatus of the present invention. As shown in FIG. 2, first delay unit 18A is provided at any place on an electric connection line from first drive circuit section 11A to angular velocity detection device 12A, first detection circuit section 13A, first processing circuit section 14A, and to first output terminal 15A. Second delay unit 18B is provided at any place on an electric connection line from second drive circuit section 11B to acceleration detection device 12B, second detection circuit section 13B, second processing circuit section 14B, and to first output terminal 15B.

With first and second delay units 18A, 18B provided, it is possible to more certainly obtain an effect concerning the forgoing improvement in reliability, which is desirable.

That is, there are cases where time T1 required for an output concerning each of the failure detection signals to reach second output terminal 16A from the first and second failure diagnosis object sections through failure diagnosis circuit 16 becomes longer for some reason. Even in such a case, providing first and second delay units 18A, 18B can reliably make time T1 shorter than time T2 required for an output concerning each of the first and second sense signals to reach first output terminals 15A, 15B from the failure diagnosis object sections.

It is to be noted that, although the description is given using angular velocity detection device 12A, acceleration detection device 12B and the like in the present embodiment, other than those, a variety of sensor apparatus such as a pressure sensor can also be implemented.

In addition, it is desirably configured such that in the case of failure diagnosis circuit 16 determining abnormality of the failure diagnosis object section, a signal outside a range of a normal output voltage is outputted from each of first output terminals 15A, 15B.

Specifically, when failure diagnosis circuit 16 determines abnormality of the failure diagnosis object sections, failure diagnosis circuit 16 transmits that information to first and second processing circuit sections 14A, 14B, and first and second processing circuit sections 14A, 14B output values to be outputted from first output terminals 15A, 15B as values outside the range of the normal output voltage. The information transmitted by failure diagnosis circuit 16 to each of first and second processing circuit sections 14A, 14B is hereinafter referred to as an "abnormal voltage value output order signal".

With reference to the foregoing "normal output voltage range", for example, it means a range of ±1.8V from a 0-point voltage when sensitivity is 6 mV/deg/s and a dynamic range is ±300 deg/s. In other words, when the 0-point voltage is 2.5 V±0.15 V, the normal output voltage range is from 1.55 to 4.45 V.

With such a configuration, it is not necessary for the controlled object such as an automobile to specifically determine whether sense signals outputted from first output terminals 15A, 15B are those during normal condition or during abnormal condition. This can further reduce the possibility to erroneously use a sense signal under abnormal condition on the controlled object side, thus leading to further improvement in reliability.

Further, in adoption of the configuration where a signal outside the range of the normal output voltage is each of outputted from first output terminals 15A, 15B in the case of failure diagnosis circuit 16 having determined abnormality of the failure diagnosis object section, the time required for transmission of an output concerning the failure detection signal from the failure diagnosis object section to failure diagnosis circuit 16 and outputting of an "abnormal voltage value output order signal" by failure diagnosis circuit 16 is referred to as "T3". It is desirably configured to make time T3 shorter than time T2 required for the output concerning each of the first and second sense signals to reach first output terminals 15A, 15B from the first and second failure diagnosis object sections. With such a configuration, it is possible to more certainly output a sense signal under abnormal condition as a value "outside the range of the normal output voltage", so as to seek further improvement in reliability.

The sensor apparatus of the present invention has an effect of allowing improvement in reliability, and is useful in automobiles, aircraft, vessels, robots, a variety of other electronic devices, and the like.

What is claimed is:

1. A sensor apparatus, comprising:
    a drive circuit section for outputting a drive signal;
    a detection device, into which the drive signal from the drive circuit section is inputted;
    a detection circuit section for fetching a response signal from the detection device;
    a processing circuit section, into which the response signal from the detection circuit section is inputted and which fetches the sense signal from this response signal;
    a first output terminal for outputting a sense signal from the processing circuit section; and
    a failure diagnosis circuit for setting as a failure diagnosis object section at least any one of the drive circuit section, the detection device, the detection circuit section and the processing circuit section, determining whether the failure diagnosis object section is normal or abnormal, and also outputting a failure detection signal from a second output terminal in the case of determining abnormality,
    wherein a delay unit is provided at any place on an electric connection line from the failure diagnosis object section to the first output terminal,
    wherein time required for an output concerning the failure detection signal from the failure diagnosis object section to reach the second output terminal is shorter than time required for an output concerning the sense signal from the failure diagnosis object section to reach the first output terminal.

* * * * *